United States Patent
Varma et al.

(10) Patent No.: US 10,445,257 B2
(45) Date of Patent: Oct. 15, 2019

(54) EXECUTION OF SUBSET OF DRIVER CODE IN SEPARATE PROTECTION DOMAIN

(71) Applicant: Microsoft Technology Licensing, LLC, Redmond, WA (US)

(72) Inventors: Shyamal Varma, Issaquah, WA (US); Kumar Rajeev, Redmond, WA (US); Peter William Wieland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/865,356

(22) Filed: Jan. 9, 2018

(65) Prior Publication Data

US 2018/0314651 A1    Nov. 1, 2018

Related U.S. Application Data

(60) Provisional application No. 62/492,202, filed on Apr. 30, 2017.

(51) Int. Cl.
| | |
|---|---|
| *G06F 13/10* | (2006.01) |
| *G06F 9/54* | (2006.01) |
| *H04L 29/06* | (2006.01) |
| *G06F 9/52* | (2006.01) |
| *G06F 21/57* | (2013.01) |
| *G06F 11/07* | (2006.01) |
| *G06F 21/53* | (2013.01) |

(52) U.S. Cl.
CPC ............ *G06F 13/102* (2013.01); *G06F 9/526* (2013.01); *G06F 9/545* (2013.01); *G06F 21/57* (2013.01); *H04L 29/06* (2013.01); *G06F 11/0715* (2013.01); *G06F 21/53* (2013.01)

(58) Field of Classification Search
CPC ......... G06F 9/545; G06F 21/53; G06F 13/102
See application file for complete search history.

(56) References Cited

U.S. PATENT DOCUMENTS

| | | | |
|---|---|---|---|
| 5,671,442 A | 9/1997 | Feeney et al. | |
| 6,871,350 B2 | 3/2005 | Wong et al. | |
| 7,730,545 B2* | 6/2010 | Milne | G06F 21/35 714/25 |
| 8,099,596 B1* | 1/2012 | Rusakov | G06F 21/53 380/200 |
| 8,434,098 B2 | 4/2013 | Lee et al. | |
| 8,595,487 B2 | 11/2013 | Govil et al. | |

(Continued)

OTHER PUBLICATIONS

"International Search Report and Written Opinion Issued in PCT Application No. PCT/US18/026644", dated Jun. 6, 2018, 10 Pages.

(Continued)

*Primary Examiner* — Brian T Misiura

(57) ABSTRACT

Described herein is a system for driver execution. A driver is loaded in a first domain with the driver controlling an associated device. In response to a request from the driver, the driver companion is loaded in a second domain different than the first domain, the second domain comprising a secure environment. The driver companion communicates with the associated device. Communications between the driver and the driver companion are managed (e.g., by an operating system framework). In response to a request from the driver, the driver companion is unloaded.

20 Claims, 4 Drawing Sheets

(56) References Cited

U.S. PATENT DOCUMENTS

| | | | |
|---|---|---|---|
| 9,075,985 B2 | 7/2015 | Diaz-Cuellar et al. | |
| 9,619,308 B2 | 4/2017 | Adda et al. | |
| 9,904,782 B2* | 2/2018 | Woodward | G06F 21/554 |
| 10,097,513 B2* | 10/2018 | Barakat | H04L 63/00 |
| 2006/0150256 A1 | 7/2006 | Fanton et al. | |
| 2006/0242270 A1* | 10/2006 | Sankaranarayan | G06F 9/4411 |
| | | | 709/220 |
| 2012/0131375 A1 | 5/2012 | Adda et al. | |
| 2016/0092678 A1* | 3/2016 | Probert | G06F 9/45558 |
| | | | 713/193 |

OTHER PUBLICATIONS

Tim, Jones, "Invoking User-Space Applications from the Kernel", Retrieved From https://www.ibm.com/developerworks/linux/library/l-user-space-apps/l-user-space-apps-pdf.pdf, Feb. 16, 2010, 9 Pages.

Costan, Victor, et. al, "Intel SGX Explained", IACR, 2016, 118 pages.

Wikipedia.org, "Software Guard Extensions", https://en.wikipedia.org/wiki/Software_Guard_Extensions, last viewed on Jan. 5, 2018, 3 pages.

* cited by examiner

EXECUTION OF SUBSET OF DRIVER CODE IN SEPARATE PROTECTION DOMAIN

RELATED APPLICATION

This application claims priority to U.S. Provisional Application No. 62/492,202, filed Apr. 30, 2017, entitled "Execution of Subset of Driver Code in Separate Protection Domain", the disclosure of which is hereby incorporated by reference herein in its entirety.

BACKGROUND

Computing systems can control device(s) using a device driver ("driver"). The device driver can serve as an interface for device(s) system resources, such as CPU registers, system memory registers, etc. Device drivers can execute in a privileged mode (e.g., kernel mode). In kernel mode, a driver has greater access to system resources than code executing in a non-privileged mode (e.g., user mode). A defective or malicious driver can compromise integrity of the computing system, leading to crashes or data corruption.

SUMMARY

Described herein is a system for driver execution, comprising: a computer comprising a processor and a memory having computer-executable instructions stored thereupon which, when executed by the processor, cause the computing device to: load the driver in a first domain, wherein the driver controls an associated device; in response to a request from the driver, load the driver companion in a second domain different than the first domain, the second domain comprising a secure environment, the driver companion communicates with the associated device; manage communications between the driver and the driver companion; and in response to a request from the driver, unload the driver companion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
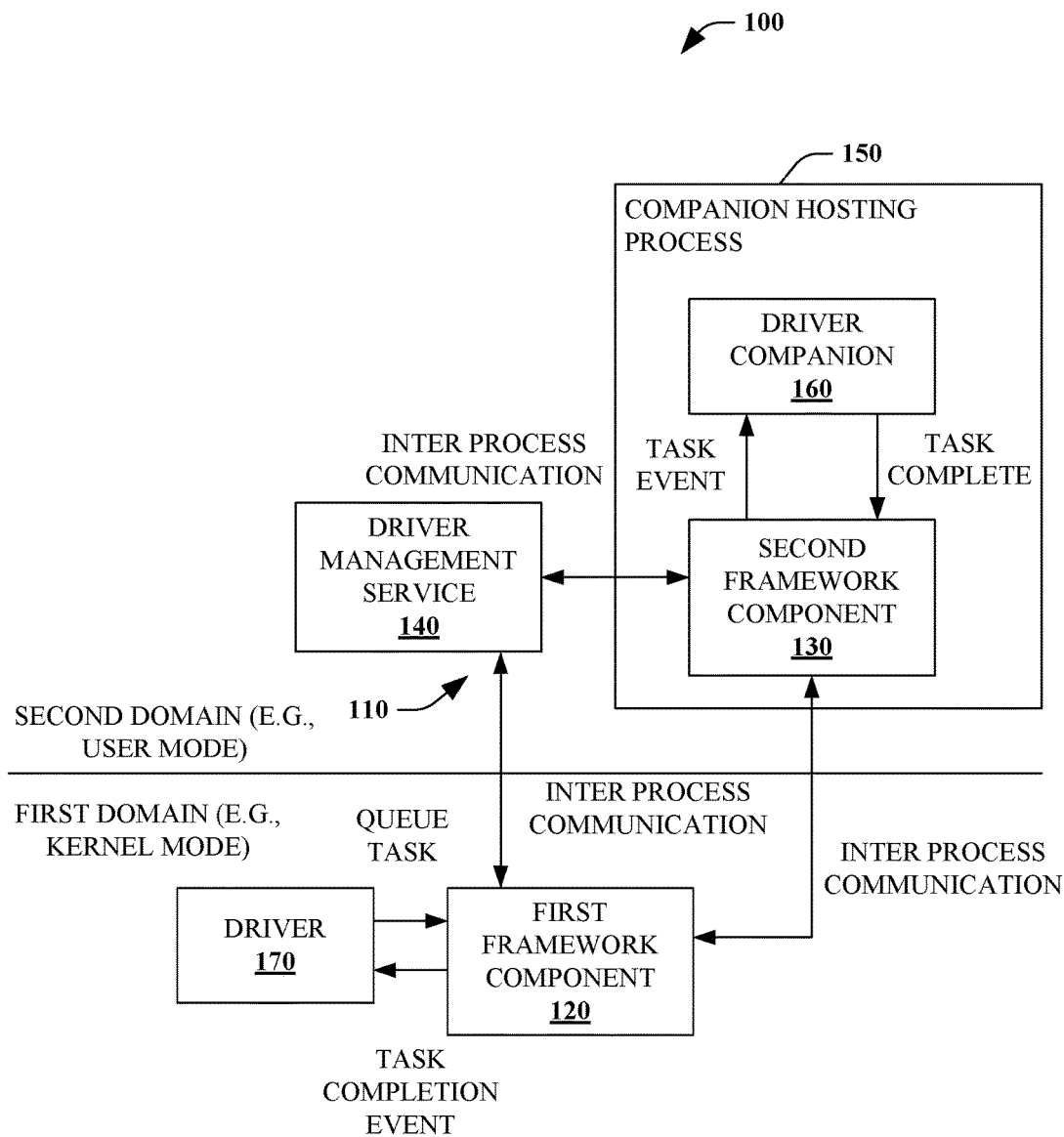
FIG. 1 is a functional block diagram that illustrates a system for driver execution.

Various technologies pertaining execution of driver code in two different protection domains are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding execution of driver code in two different protection domains. What follows are one or more exemplary systems and methods.

Aspects of the subject disclosure pertain to the technical problem of reliability, performance and/or security of driver execution. The technical features associated with addressing this problem involve providing a driver having a first portion executing in a first domain and a second portion executing in a second different domain, providing an operating system framework that facilitates communication between the first and second portion of the driver, and the framework managing lifetime of portion(s) of the driver. Accordingly, aspects of these technical features exhibit technical effects of more reliably and/or securely executing driver(s)

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for driver execution 100 is illustrated. The system 100 provides for execution of driver code in two different protection domains (e.g., user mode, kernel mode, different virtual trust levels, different address spaces etc.).

Driver(s) can control an associated device. Driver(s) can work closely with an operating system kernel and, in many cases, are written by third party(ies). As such, driver(s) can play an immense role with respect to reliability, performance, and/or security of a computing system. Certain portions of device drivers are more sensitive to reliability, performance and security, for example, I/O transactions, CPU-intensive algorithms, secure biometric transactions, encryption and/or decryption key(s) and/or algorithm(s), and/or reusable code already existent in different domain. By executing such a portion of driver code in a separate protection domain, the system 100 helps improve reliability, performance and/or security without complicating the driver.

The system 100 increases reliability, performance and/or security over other attempts such as having multiple independent components communicate with each other, by splitting portions of driver into separate independent drivers, and/or by writing a monolithic driver at the cost of reliability, performance, and/or security.

Having multiple independent components communicating with each other has the disadvantage of increased complexity leading to higher development time and higher maintenance cost. The complexity comes in the form of, for example, state management of two different and independent components, lifetime management, need for crafting a communication protocol, poor ability to be debugged of failures due to involvement of multiple components and so forth.

Similarly, splitting the driver into two independent drivers is similar to the above with the difference here being that the two components are both drivers. The fact that one single hardware is managed by two drivers itself leads to more complex design, difficulty in synchronizing operations between two drivers and two drivers maintaining separate state for the same device.

There is a division of responsibilities between the two drivers and each driver must manage its device state corresponding to its location in the device stack. This is cumbersome and very hard to make reliable, because while there is a division of responsibility between the drivers, each one needs to be written as though it were a full-fledged driver and account for the other's Plug and Play (PnP) and/or Power state before interacting with it. It is also not straightforward for the two drivers to communicate with one another as they would have to send each other intra-stack I/O requests, which would also need to be synchronized with the device's PnP/Power state.

The system 100 includes a framework 110 comprising a first framework component 120 executing within a first domain and a second framework component 130 executing within a second domain (e.g., different domain than first domain). The framework 110 further comprises a driver management service component 140 that facilitates communication between the first framework component 120 and the second framework component 130. The framework 110 also comprises a companion hosting process 150 that hosts a driver companion 160 associated with a driver 170.

The system 100 does not create two full-fledged drivers. Instead, at design time, a developer can take a subset of the driver code that the developer desires to run in a different domain (e.g., different process, higher trust level etc.) and have the subset of code run as the driver companion 160 (e.g., extension). At runtime, the driver 170 continues to manage the device's plug and play (PnP) and/or power state but is provided the ability to conveniently call out to the associated driver companion 160 to perform task(s) that, as determined by the developer, are to be performed in the different domain (e.g., securely). This is a much simpler solution because there is a single device state to be managed, by a single driver 170. The operating system's driver framework 110 (e.g., Windows® Driver Framework) manages the loading of the driver companion 160 and its lifetime.

In one embodiment, the framework 100 can also provide a "Companion Target" object for the driver 170 to use to queue "Tasks" for the driver companion 160 to process. The state of this "Companion Target" can be synchronized with the device's state automatically. For example before the driver companion 160 unloads, all requests can be drained.

In one embodiment, a kernel mode driver 170 interacts with a driver framework 110 that is provided by the operating system (OS). This framework 110 provides the driver 170 with APIs and/or event callbacks that allow the driver 170 to manage the device's state conveniently. The driver 170 has a driver companion 160 that the framework 110 automatically loads in the companion host process 150 in user-mode based on a setting specified in the driver package. The driver 170 then uses objects and/or APIs provided by the framework 110 to interact with the driver companion 160. In one embodiment, the framework 110 automatically drain this task queue in the event the device is removed and/or the companion hosting process 150 crashes.

The driver management service 140 is another operating system-provided component that can assist the framework 110 in managing the lifetime of the driver companion hosting process(es) 150 as per the plug-n-play (PnP) state of the device. The driver management service 140 can also be used to automatically re-start the failed host process in the event of a crash, without crashing the entire system (as a kernel mode crash typically would).

In one embodiment, both the driver 170 and its associated driver companion 160 use the API surface provided by the same driver framework 110. The driver companion 160 has a subset of framework 110 provided APIs available to it as compared the kernel driver 170, but it can use those just as it would in kernel mode.

In one embodiment, the system 100 allows for isolation of a subset of driver code (e.g., the driver companion 160) to a user mode process, for example, as a means to enhance system reliability. In one embodiment, the system 100 further allows for isolation of a subset of driver code (e.g., the driver companion 160) to a different security domain (e.g., a higher trust level), for example, to protect sensitive user data. In one embodiment, the system 100 allows the driver 170 the ability to access a service/application programming interface (API) that is not available in kernel mode via its user mode driver companion 160. In one embodiment, the driver companion 160 can execute in a secure environment and communicate with an associated device.

In one embodiment, the system 100 does not require that the entire driver be ported to run in user-mode, but instead the driver 170 can run in kernel mode while the driver companion 160 can run in user-mode. The interaction(s) of the driver 170 with the operating system, for example, around power and/or device state management can continue to reside in the driver 170.

In one embodiment, a particular driver 170 can communicate with an associated driver companion 160 using an operating system provided abstraction and the driver 170 does not need to invent the driver's own protocols around this. In one embodiment, the abstraction and APIs for interaction with the driver companion 160 are automatically synchronized with the power and plug and play (PnP) state of the driver 170.

In one embodiment, debugging is easier as the driver 170 manages a single device and the operating system can provide debugging extension(s) to diagnose the task queue(s) associated with communication between the driver 170 and the associated driver companion 160 (e.g., which communicates with the single device). In one embodiment, the driver 170 and associated driver companion 160 are linked against the same framework 110 so the driver 170 and associated driver companion 160 can program against the same API surface.

The system 100 executes the driver companion 160 in a different protection domain than the driver 170, for example, to improve reliability, performance and/or security. In one embodiment, the different protection domain of the driver companion 160 is a separate address space. In one embodiment, the different protection domain of the driver companion 160 is a separate security domain (e.g., user mode, virtual trust level, etc.).

In one embodiment, the driver 170 can interact with an associated driver companion 160 by sending custom command-control message(s) known as "task(s)". The driver companion 160 can process these task(s) out of a queue known as a "task queue". By isolating execution of the driver companion 160 (e.g., code and associated data, if any) from the driver 170 thus allowing the driver companion 160 to process the task in a domain of the driver companion 160, the system 100 can prevent attacks on the code of the driver companion 160 and/or leakage of the data out of the domain of the driver companion 160.

For example, for a driver 170 executing in kernel mode, the driver 170 can execute an associated driver companion 160 (e.g., a subset of code) in user mode so as to avoid kernel mode exception(s) that can, for example, crash an entire system. The driver 170 executing in kernel mode does not need to move in its entirety to run in user mode.

In one embodiment, the driver 170 can be associated with a biometric device (e.g., fingerprint, iris scan, etc.). In order to protect sensitive data such as biometric data associated with a user, the system 100 can facilitate the driver companion to execute in a different virtual trust level (VTL). For example, the driver companion 160 can execute in a higher level VTL (e.g., "isolated user mode") as compared with the driver 170, for example, in order to prevent secret(s) from being stolen in the event that the kernel of the driver 170 is compromised.

Figure 2:
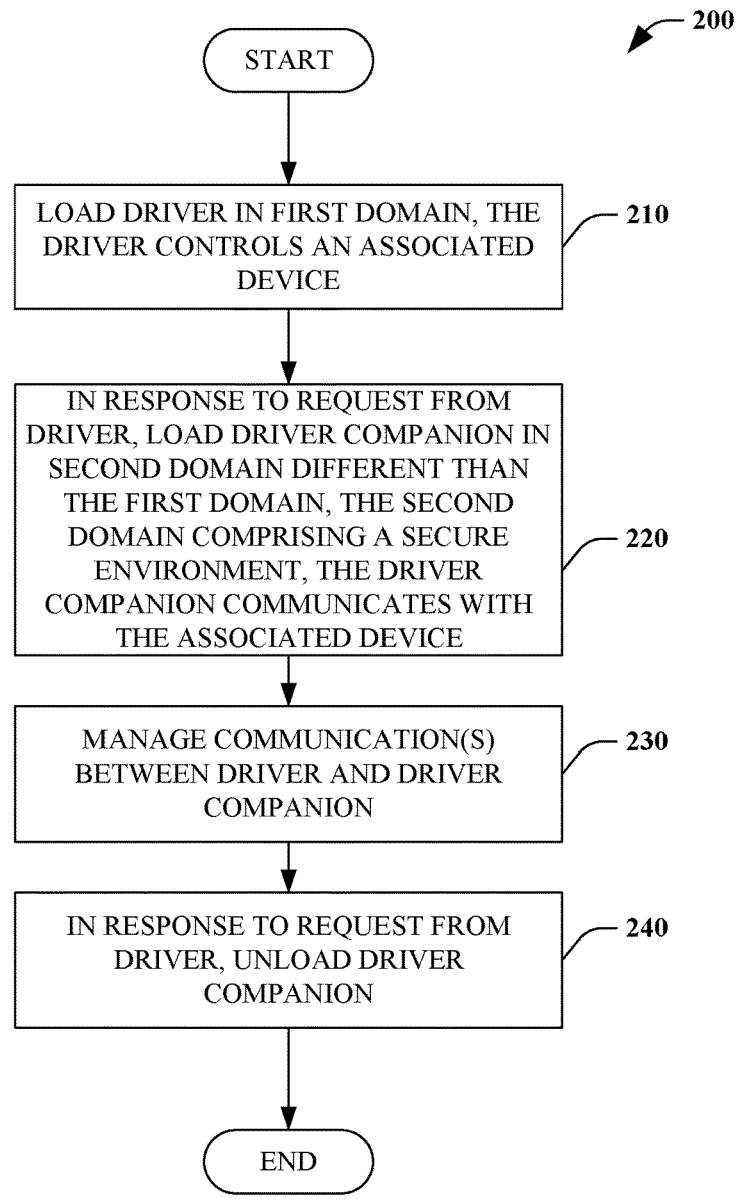
FIG. 2 illustrates an exemplary method of executing a driver and an associated driver companion.
Figure 3:
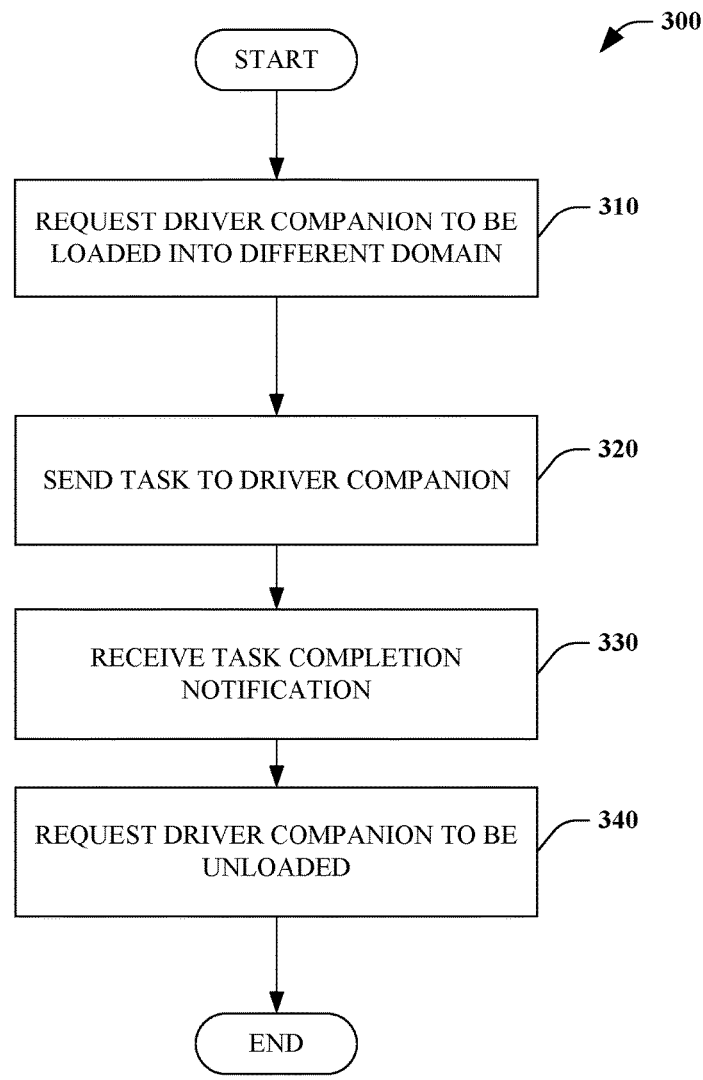
FIG. 3 illustrates an exemplary method of executing a driver.

FIGS. 2 and 3 illustrate exemplary methodologies relating to execution of driver code in two different protection domains. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 2, a method of executing a driver and an associated driver companion 200 is illustrated. For example, the method 200 can be performed by a framework 110 of an operating system.

At 210, a driver (e.g., driver 170) is loaded in a first domain (e.g., kernel mode). In one embodiment, the driver controls an associated device. At 220, in response to a request from the driver, a driver companion (e.g., driver companion 160) is loaded in a second domain (e.g., user mode) different than the first domain. In one embodiment, the second domain comprises a secure environment. The driver companion communicates with the associated device.

At 230, communication(s) between the driver and the driver companion are managed. At 240, in response to a request from the driver, the driver companion is unloaded.

Turning to FIG. 3, a method of executing a driver 300 is illustrated. For example, the method 300 can be performed by the driver 170 executing in a first domain.

At 310, a request is made to load a driver companion into a different domain. At 320, a task is sent to the driver companion. At 330, a task completion notification is received. At 340, a request is made to unload the driver companion.

Described herein is a system for driver execution. The system include a computer comprising a processor and a memory having computer-executable instructions stored thereupon which, when executed by the processor, cause the computing device to: load the driver in a first domain, wherein the driver controls an associated device; in response to a request from the driver, load the driver companion in a second domain different than the first domain, the second domain comprising a secure environment, the driver companion communicates with the associated device; manage communications between the driver and the driver companion; and, in response to a request from the driver, unload the driver companion. The system can include wherein the driver executes in a kernel mode and the driver companion executes in a user mode.

The system can further include wherein the driver executes in a first virtual trust level and the driver companion executes in a second higher virtual trust level. The system can include wherein the driver executes in a first address space and the driver companion executes in a second different address space. The system can further include wherein the driver companion securely stores biometric information about a user of the computer.

The system can include wherein the driver companion securely stores at least one of an encryption key or a decryption key. The system can further include wherein the driver companion securely executes at least one of a sensitive input transaction or a sensitive output transaction. The system can include wherein a task queue facilitates communications between the driver and the driver companion.

The system can further include wherein a framework manages a lifetime associated with the driver companion. The system can include wherein the driver manages a plug and play (PnP) state and a power state of a device associated with the driver.

Described herein is a method of executing a driver and an associated driver companion. The method includes loading the driver in a first domain, wherein the driver controls an associated device; in response to a request from the driver, loading the driver companion in a second domain different than the first domain, the second domain comprising a secure environment, the driver companion communicating with the associated device; managing communications between the driver and the driver companion; and in response to a request from the driver, unloading the driver companion.

The method can include wherein the first domain is kernel mode and the second domain is user mode. The method can further include wherein the driver manages the associated device using the driver companion. The method can further include wherein the driver executes in a first address space and the driver companion executes in a second different address space. The method can include wherein the driver companion securely stores information about a user of the computer.

Described herein is a computer storage media storing computer-readable instructions that when executed cause a computing device to: load a driver in a first domain, the driver controls an associated device; in response to a request from the driver, load a driver companion in a second domain different than the first domain, the second domain comprising a secure environment, the driver companion communicates with the associated device; manage communications between the driver and the driver companion; and in response to a request from the driver, unload the driver companion. The computer storage media can further include wherein the first domain is kernel mode and the second domain is user mode.

The computer storage media can include wherein the first domain is a first virtual trust level and the second domain is a second higher virtual trust level. The computer storage media can further include wherein the driver executes in a first address space and the driver companion executes in a second different address space. The computer storage media can include wherein the driver companion securely stores information about a user of the computer.

Figure 4:
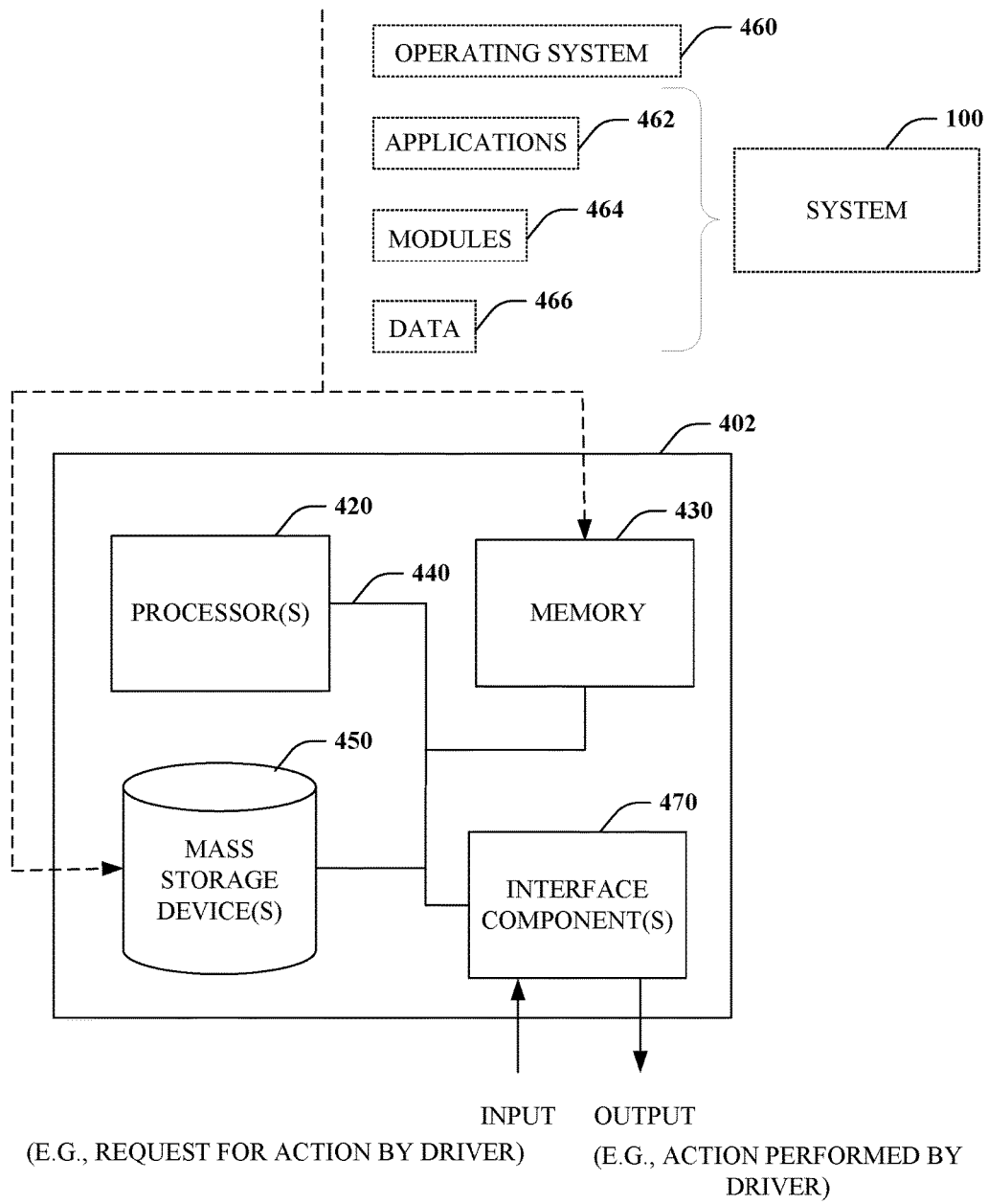
FIG. 4 is a functional block diagram that illustrates an exemplary computing system.

With reference to FIG. 4, illustrated is an example general-purpose computer or computing device 402 (e.g., mobile phone, desktop, laptop, tablet, watch, server, handheld, programmable consumer or industrial electronics, set-top box, game system, compute node, etc.). For instance, the computing device 402 may be used in a system for driver execution 100.

The computer 402 includes one or more processor(s) 420, memory 430, system bus 440, mass storage device(s) 450, and one or more interface components 470. The system bus 440 communicatively couples at least the above system constituents. However, it is to be appreciated that in its simplest form the computer 402 can include one or more processors 420 coupled to memory 430 that execute various computer executable actions, instructions, and or components stored in memory 430. The instructions may be, for instance, instructions for implementing functionality described as being carried out by one or more components discussed above or instructions for implementing one or more of the methods described above.

The processor(s) 420 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 420 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 420 can be a graphics processor.

The computer 402 can include or otherwise interact with a variety of computer-readable media to facilitate control of the computer 402 to implement one or more aspects of the claimed subject matter. The computer-readable media can be any available media that can be accessed by the computer 402 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 402. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 430 and mass storage device(s) 450 are examples of computer-readable storage media. Depending on the exact configuration and type of computing device, memory 430 may be volatile (e.g., RAM), non-volatile (e.g., ROM, flash memory, etc.) or some combination of the two. By way of example, the basic input/output system (BIOS), including basic routines to transfer information between elements within the computer 402, such as during start-up, can be stored in nonvolatile memory, while volatile memory can act as external cache memory to facilitate processing by the processor(s) 420, among other things.

Mass storage device(s) 450 includes removable/non-removable, volatile/non-volatile computer storage media for storage of large amounts of data relative to the memory 430. For example, mass storage device(s) 450 includes, but is not limited to, one or more devices such as a magnetic or optical disk drive, floppy disk drive, flash memory, solid-state drive, or memory stick.

Memory 430 and mass storage device(s) 450 can include, or have stored therein, operating system 460, one or more applications 462, one or more program modules 464, and data 466. The operating system 460 acts to control and allocate resources of the computer 402. Applications 462 include one or both of system and application software and can exploit management of resources by the operating system 460 through program modules 464 and data 466 stored in memory 430 and/or mass storage device (s) 450 to perform one or more actions. Accordingly, applications 462 can turn a general-purpose computer 402 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 462, and include one or more modules 464 and data 466 stored in memory and/or mass storage device(s) 450 whose functionality can be realized when executed by one or more processor(s) 420.

In accordance with one particular embodiment, the processor(s) 420 can correspond to a system on a chip (SOC) or like architecture including, or in other words integrating, both hardware and software on a single integrated circuit substrate. Here, the processor(s) 420 can include one or more processors as well as memory at least similar to processor(s) 420 and memory 430, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 402 also includes one or more interface components 470 that are communicatively coupled to the system bus 440 and facilitate interaction with the computer 402. By way of example, the interface component 470 can be a port (e.g., serial, parallel, PCMCIA, USB, FireWire, etc.) or an interface card (e.g., sound, video, etc.) or the like. In one example implementation, the interface component 470 can be embodied as a user input/output interface to enable a user to enter commands and information into the computer 402, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 470 can be embodied as an output peripheral interface to supply output to displays (e.g., LCD, LED, plasma, etc.), speakers, printers, and/or other computers, among other things. Still further yet, the interface component 470 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for driver execution, comprising:
   a computer comprising a processor and a memory having computer-executable instructions stored thereupon which, when executed by the processor, cause the computing device to:
   load the driver in a first domain, wherein the driver controls an associated device and solely manages state of the associated device, the driver comprising a portion of driver code;
   in response to a request from the driver, load a driver companion comprising a subset of the driver code in a second domain different than the first domain, the second domain comprising a secure environment, the driver companion communicates with the associated device;
   manage communications between the driver and the driver companion including a request from the driver to the driver companion to perform a particular task;
   execute driver code by the driver;
   execute driver code by the driver companion in response to the request to perform the particular task; and
   in response to a request from the driver, unload the driver companion.

2. The system of claim 1, wherein the driver executes in a kernel mode and the driver companion executes in a user mode.

3. The system of claim 1, wherein the driver executes in a first virtual trust level and the driver companion executes in a second higher virtual trust level.

4. The system of claim 1, wherein the driver executes in a first address space and the driver companion executes in a second different address space.

5. The system of claim 1, wherein the driver companion securely stores biometric information about a user of the computer.

6. The system of claim 1, wherein the driver companion securely stores at least one of an encryption key or a decryption key.

7. The system of claim 1, wherein the driver companion securely executes at least one of a sensitive input transaction or a sensitive output transaction.

8. The system of claim 1, wherein a task queue facilitates communications between the driver and the driver companion.

9. The system of claim 1, wherein a framework manages a lifetime associated with the driver companion.

10. The system of claim 1, wherein the driver manages a plug and play (PnP) state and a power state of a device associated with the driver.

11. A method of executing a driver and a driver companion, comprising:
    loading the driver in a first domain, wherein the driver controls an associated device and solely manages state of the associated device, the driver comprising a portion of driver code;
    in response to a request from the driver, loading the driver companion comprising a subset of the driver code in a second domain different than the first domain, the second domain comprising a secure environment, the driver companion communicating with the associated device;
    managing communications between the driver and the driver companion including a request from the driver to the driver companion to perform a particular task;
    executing driver code by the driver;
    executing driver code by the driver companion in response to the request to perform the particular task; and
    in response to a request from the driver, unloading the driver companion.

12. The method of claim 11, wherein the first domain is kernel mode and the second domain is user mode.

13. The method of claim 11, wherein the driver manages the associated device using the driver companion.

14. The method of claim 11, wherein the driver executes in a first address space and the driver companion executes in a second different address space.

15. The method of claim 11, wherein the driver companion securely stores information about a user of the computer.

16. A computer storage media storing computer-readable instructions that when executed cause a computing device to:
   load a driver in a first domain, the driver controls an associated device and solely manages state of the associated device, the driver comprising a portion of driver code;
   in response to a request from the driver, load a driver companion comprising a subset of the driver code in a second domain different than the first domain, the second domain comprising a secure environment, the driver companion communicates with the associated device;
   manage communications between the driver and the driver companion including a request from the driver to the driver companion to perform a particular task;
   execute driver code by the driver;
   execute driver code by the driver companion in response to the request to perform the particular task; and
   in response to a request from the driver, unload the driver companion.

17. The computer storage media of claim 16, wherein the first domain is kernel mode and the second domain is user mode.

18. The computer storage media of claim 16, wherein the first domain is a first virtual trust level and the second domain is a second higher virtual trust level.

19. The computer storage media of claim 16, wherein the driver executes in a first address space and the driver companion executes in a second different address space.

20. The computer storage media of claim 16, wherein the driver companion securely stores information about a user of the computer.

* * * * *